United States Patent [19]
Goldinger

[11] Patent Number: 5,564,091
[45] Date of Patent: Oct. 8, 1996

[54] METHOD AND APPARATUS FOR OPERATING AN AUTOMATIC FREQUENCY CONTROL IN A RADIO

[75] Inventor: James E. Goldinger, Boynton Beach, Fla.

[73] Assignee: Motorola, Inc., Schaumburg, Ill.

[21] Appl. No.: 412,660

[22] Filed: Mar. 29, 1995

[51] Int. Cl.$^6$ .................................................. H04B 17/00
[52] U.S. Cl. ............................... 455/226.2; 455/182.1; 455/192.2; 455/309; 375/344
[58] Field of Search ........................ 455/226.2, 134, 455/164.1, 182.1, 182.2, 259, 256, 258, 309, 192.2, 192.1, 192.3, 182.3, 196.1, 260, 264, 316; 375/316, 317, 344

[56] References Cited

U.S. PATENT DOCUMENTS

| | | | |
|---|---|---|---|
| 4,152,652 | 5/1979 | Taylor et al. | 455/226.2 |
| 4,271,530 | 6/1981 | Van Deursen | 455/182.1 |
| 4,498,191 | 2/1985 | Rogers | 455/182.2 |
| 4,891,637 | 1/1990 | Siwiak et al. | 340/825.44 |
| 4,947,409 | 8/1990 | Raith et al. | 375/97 |
| 5,025,251 | 6/1991 | Mittel et al. | 340/825.44 |
| 5,121,411 | 6/1992 | Fluharty | 375/317 |
| 5,239,684 | 8/1993 | Ishikura | 455/226.2 |
| 5,408,693 | 4/1995 | Alton et al. | 455/226.2 |
| 5,423,085 | 6/1995 | Lim | 455/182.2 |

Primary Examiner—Reinhard J. Eisenzopf
Assistant Examiner—Gertrude Arthur
Attorney, Agent, or Firm—R. Louis Breeden

[57] ABSTRACT

A method and apparatus for determining received signal strength of a radio frequency signal of a frequency dependent device to determine errors in automatic frequency control calculations. The method includes the steps of: 1) receiving the radio frequency signal; 2) providing at least two artificial thresholds based upon the signal during a first portion (45) of a signal block (32), wherein the artificial thresholds lie outside the peak and valley amplitudes of a demodulated intermediate signal (225) of the radio frequency signal; 3) providing automatic frequency control to determine a frequency error value (250) during a second portion (46) of the signal block (32); 4) determining a correction factor based upon the position of the demodulated signal in relation to the artificial thresholds during the second portion (46) of the signal block (32); and 5) varying the frequency of an adjustable crystal (220) in accordance with the correction factor applied to the frequency error value (250). The adjustable crystal (220) controls the frequency of a transmitter (112) of the frequency dependent device and the frequency of the local oscillator (210), the signal of which is mixed with the radio frequency signal to produce the intermediate signal (215). The apparatus comprises the circuitry for determining received signal strength of a radio frequency signal according to the above described method.

21 Claims, 4 Drawing Sheets

METHOD AND APPARATUS FOR OPERATING AN AUTOMATIC FREQUENCY CONTROL IN A RADIO

FIELD OF THE INVENTION

This invention relates in general to a method and apparatus for determining received signal strength utilizing decoding thresholds. More particularly, this invention relates to method and apparatus for determining received signal strength utilizing decoding thresholds to detect signal conditions during automatic frequency control (AFC) calculations and correct the crystal frequency only when AFC information is accurate for use in selective call receiver/transmitter devices, specifically two-way asymmetric paging devices or acknowledge-back pagers.

BACKGROUND OF THE INVENTION

The Federal Communication Commission (FCC) has recently set aside spectrum for the Narrowband Personal Communications Services (PCS) channels. The devices that will operate in the Narrowband PCS channels must adhere to a one part-per-million (ppm) frequency stability requirement for their transmitters. For example a transmitter operating at 940 MHz must be accurate in center frequency to within 940 Hz to satisfy the 1 ppm stability requirement. This spectrum may be used for many services, including advanced messaging and paging, two-way pagers, and acknowledge-back (ack-back) pagers. Ack-back pagers are those selective call receivers that not only receive but also transmit (automatically and/or manually) an acknowledge signal in response to receiving their selective call address or a message, such as that described in U.S. Pat. No. 4,891,637 to Siwiak et al. assigned to the assignee of the present application, incorporated herein by reference and described below.

The components of an ack-back pager, for instance, include an antenna coupled through a transmit/receive switch to either a transmitter or a receiver. A second antenna may also be utilized, thereby eliminating the need for a switch. The general operation of the pager is elaborated below.

In current paging systems, paging signals are transmitted from a paging transmitter to a multiplicity of portable paging receivers according to a prespecified modulation format including, for example, serialized digitally coded sync, address, and message data words. Each paging receiver includes an input stage which receives, demodulates, and converts the paging signal into an analog signal having a DC bias level.

The receiver circuits usually comprise a combination of filters, mixers and oscillators. The receiver circuits generate a recovered signal suitable for processing by a discriminator. Typically the bandwidth of the intermediate frequency (IF) filter(s) is small compared to the high frequency received signal. Therefore, to maintain proper operation, the requirements of the first local oscillator become extreme in terms of frequency stability.

In the next stage of the paging receiver, amplitude signals are generated by a data limiter or microprocessor. For example, the amplitude signal could be representative of binary states (e.g., zero or one), for the duration over which the amplitude of the analog signal is above or below a set threshold level. The serially generated binary states represent bits of the digitally coded words of the paging signal. There could also be a multiplicity of states that would correspond to a greater number of bits per state.

The DC level is not considered fixed, but rather relative to the recovered paging signal. Consequently, the threshold level of the data limiter is not set at a constant value, but rather is dynamically acquired from the immediate paging signal.

Most paging transmission formats include a digitally coded word (e.g., sync word) to synchronize the operation of the various paging receivers to the digitally coded address words transmitted successfully thereafter in a transmission cycle. Paging receivers are customarily preprogrammed with the slot of the sync word and the slot in which the corresponding address is expected to be transmitted with respect to the sync word.

After receiving a message, some pagers allow for acknowledge-back data to be transmitted. The user may input the data into the microprocessor by a variety of means. The microprocessor processes this data and supplies binary output data from output port to the input port of a digital to analog (D/A) converter. The output signal is passed to the transmitter for processing and transmission. The transmitter generally includes frequency synthesis circuitry. Such circuitry may include a crystal oscillator, a varactor, a voltage controlled oscillator, RF amplifiers and filters.

In order to maintain proper operation, since the requirements of the first local oscillator become extreme in terms of frequency stability, a high stability crystal could be required. While such high stability crystals are obtainable, the prices are often prohibitively high and require temperature compensation circuits to control the stability of the total oscillator circuit. Furthermore, to operate in the Narrowband PCS channels the transmitter must adhere to a one part-per-million (ppm) frequency stability.

An alternative to using a high stability reference crystal is an Automatic Frequency Control (AFC) scheme. This would allow the portable units to use the base station transmitters as an accurate frequency reference and make adjustments according to its received signal.

However, in land mobile environments, a sufficiently strong signal that could be used as a reference does not always exist. In addition, channel conditions such as Rayleigh fading and Doppler shifting could make it impossible for the portable unit to discern the exact frequency of the transmissions. The portable unit must recognize when it is receiving a sufficiently strong and clear signal.

An AFC scheme could require the forward-channel transmitters to output an unmodulated, continuous-wave signal for a given time in order that the paging receiver can lock on to this signal. The output of this signal from the demodulator would be one constant voltage level that would correspond to the intermediate frequency to which the pager is tuned. The error in this measured voltage within the discriminator is mainly due to the frequency error of the local oscillators within the pager. Based on this error information, the pager can correct the frequency of its local oscillator. Drawbacks to such an AFC scheme involve use of the carrier's air time to provide an unmodulated signal which is prohibitive in cost and limits the band's capacity.

Another method of AFC used in two-way paging schemes involves the detection of the paging signal and then mixing the signal down to an intermediate frequency (IF) with local oscillators within the pager. The discriminator then detects the frequency shifts at the IF that transmit the data in such a Frequency Shift Keying (FSK) system. The highest and lowest (peak and valley) shifts are measured within the discriminator. The average of the two (audio median) would be the voltage level associated with the intermediate frequency to which the pager is tuned. A demodulated reference is provided which is representative of an output of the demodulator when the input is a zero frequency error intermediate frequency. The error between this audio median and the demodulator center in this measured voltage within the discriminator is mainly due to the frequency error of the local oscillators within the pager. Based on this error information, the pager can correct the frequency of its local oscillator.

However, one problem with this error detection scheme is that the error information on the received peaks and valleys determined in the discriminator could likely be based on artificial peaks or valleys. These artificial peaks or valleys may be due to channel conditions such as Doppler shifts, Rayleigh fading, or spurious signals The artificial peaks or valleys would result in an incorrect frequency error determination. Accordingly, the accuracy of this AFC scheme is limited.

Thus, there is a need in the art for an economical AFC scheme that increases the overall stability of a selective call receiver/transmitter without the requirement of a high stability reference crystal oscillator.

Furthermore, there is a need in the art for a method and apparatus for determining received signal strength to detect signal conditions during AFC calculations and correct the crystal frequency only when AFC information is accurate.

DESCRIPTION OF THE PREFERRED EMBODIMENT

Figure 1:
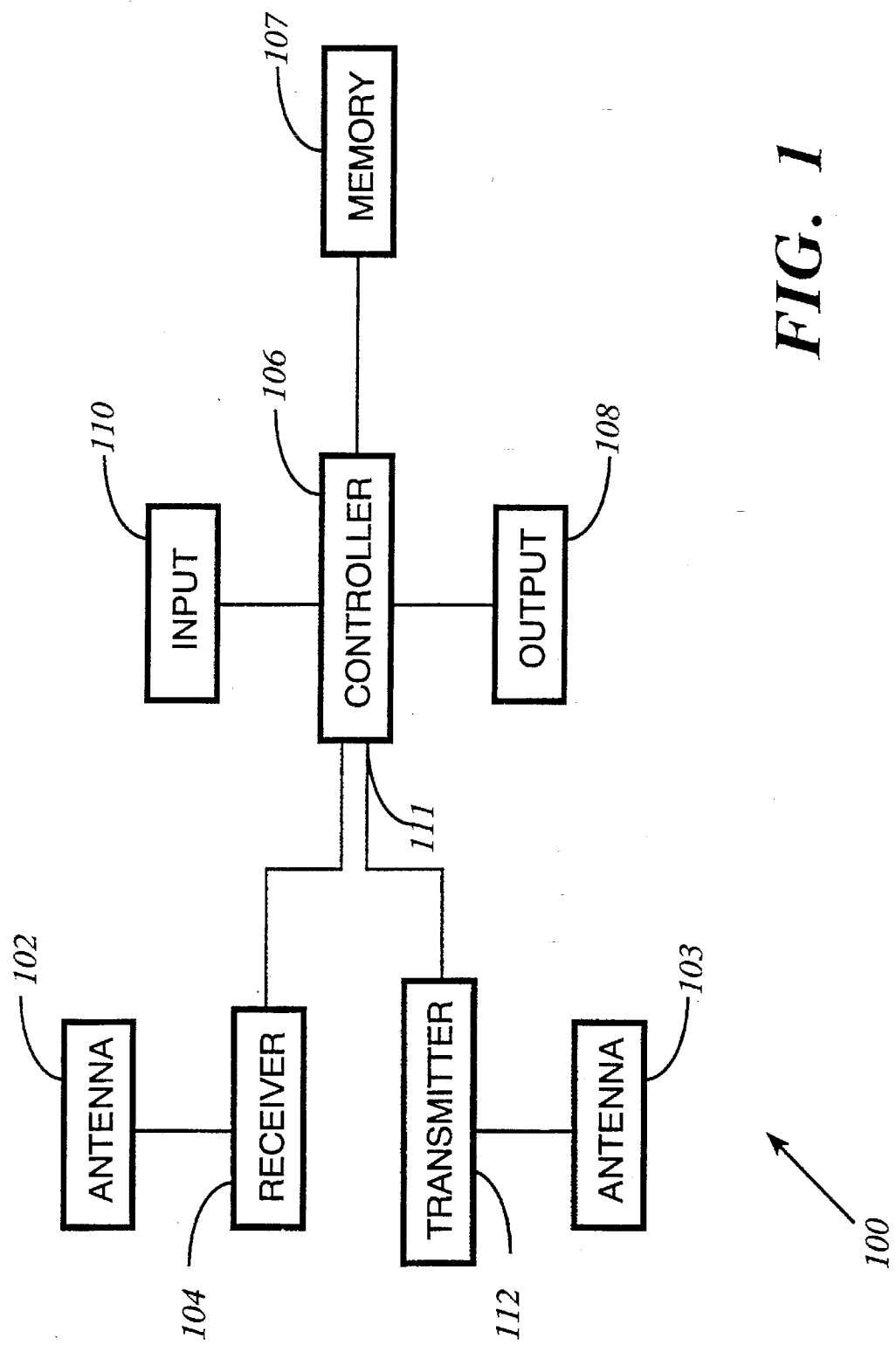
FIG. 1 is a block diagram of a selective call receiver/transmitter suitable for use in accordance with the present invention.

Referring initially to FIG. 1, a frequency dependent device, such as a selective call receiver/transmitter 100 (e.g., ack-back pager), in a preferred embodiment of the invention is shown. Ack-back pagers are those selective call receivers that transmit (automatically and/or manually) an acknowledge signal in response to receiving their selective call address or a message. The ack-back pager 100 generally comprises an antenna(s) 102, 103, a receiver module 104, a decoder/controller module 106 (i.e., microprocessor), output 108 and input devices 110, memory 107 and a transmitter module 112.

An ack-back pager, in the preferred embodiment, has two separate antennas 102, 103. One antenna 102 would be for the receiver 104 and one antenna 103 for the transmitter 112. Alternatively, in another embodiment, the ack-back pager may incorporate only one antenna 102, a transmit/receive antenna exhibiting appropriate size and geometry to permit transmission and reception of radio frequency signals. The antenna 102 may be coupled to a common port of a transmit receive switch. The transmit/receive switch includes a receive port and a transmit port in addition to the above mentioned antenna input port. The switch includes an appropriate control input. When an appropriate control input signal is supplied to the control input, the switch couples the antenna port to the receive port to place the pager in the receive mode. Alternatively, when an appropriate control signal is supplied to the control input, the switch couples the antenna port to the transmit port to place the pager in the transmit mode. These control signals may be supplied to the control input by a microprocessor, such as the M68HC05 manufactured by Motorola, Inc.

Figure 2:
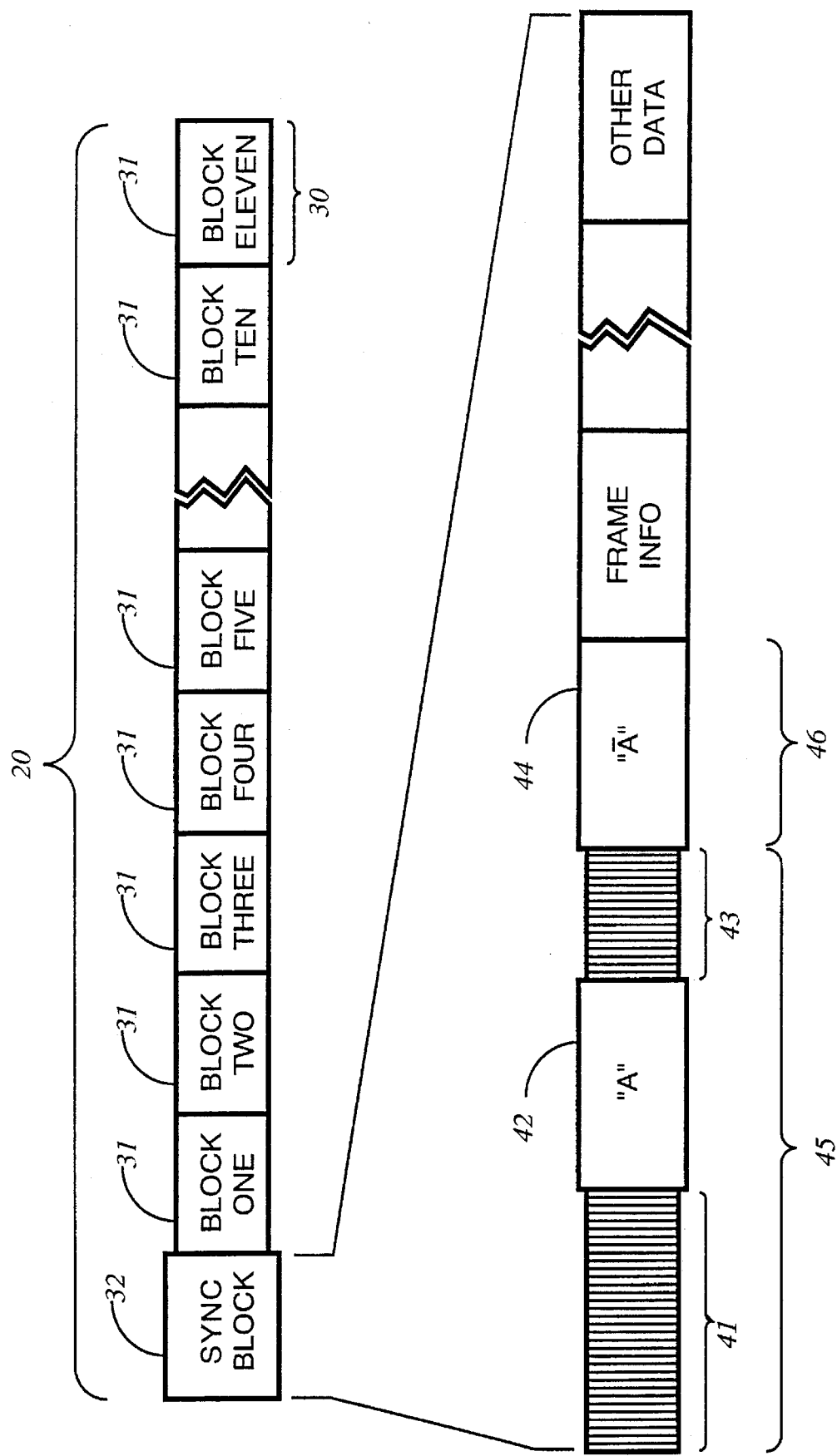
FIG. 2 is a representation of the preferred signaling protocol according to the present invention.

The signaling protocol o:f the preferred embodiment is preferably a protocol as illustrated in FIG. 2, which is a synchronous outbound signaling protocol. One skilled in the art will recognize other protocols suitable for use with the invention. The preferred signaling protocol is subdivided into protocol divisions, which are an hour, a cycle, a frame 20, a block 30, and a word 40. Up to fifteen uniquely identified cycles are transmitted in each hour. Up to one hundred twenty-eight frames 20 are transmitted in each of the cycles. One synchronization signal block 32 and eleven uniquely identified message blocks 31 are transmitted in each frame 20. Bit rates of 1600 bits per second (bps), 3200 bps, or 6400 bps are usable during each frame. For a bit rate of 1600 bps, for example, eight 32 bit uniquely identified words 40 are transmitted in each message block 31. The first portion of the synchronization signal block 32 is used to acquire bit and frame synchronization to the signaling protocol base baud rate (e.g., 1600 bps). A thirty-two bit pattern of alternating ones and zeros is utilized for acquiring bit synchronization 41 and a BCH word "A" 42 is used for frame synchronization and in addition conveys the baud rate at which the information blocks are transmitted. An additional sixteen bit one/zero pattern 43 aids bit synchronization and a BCH word "A inverse" 44 is used for redundancy to provide a second opportunity for frame synchronization and for determining the baud rate information.

Figure 3:
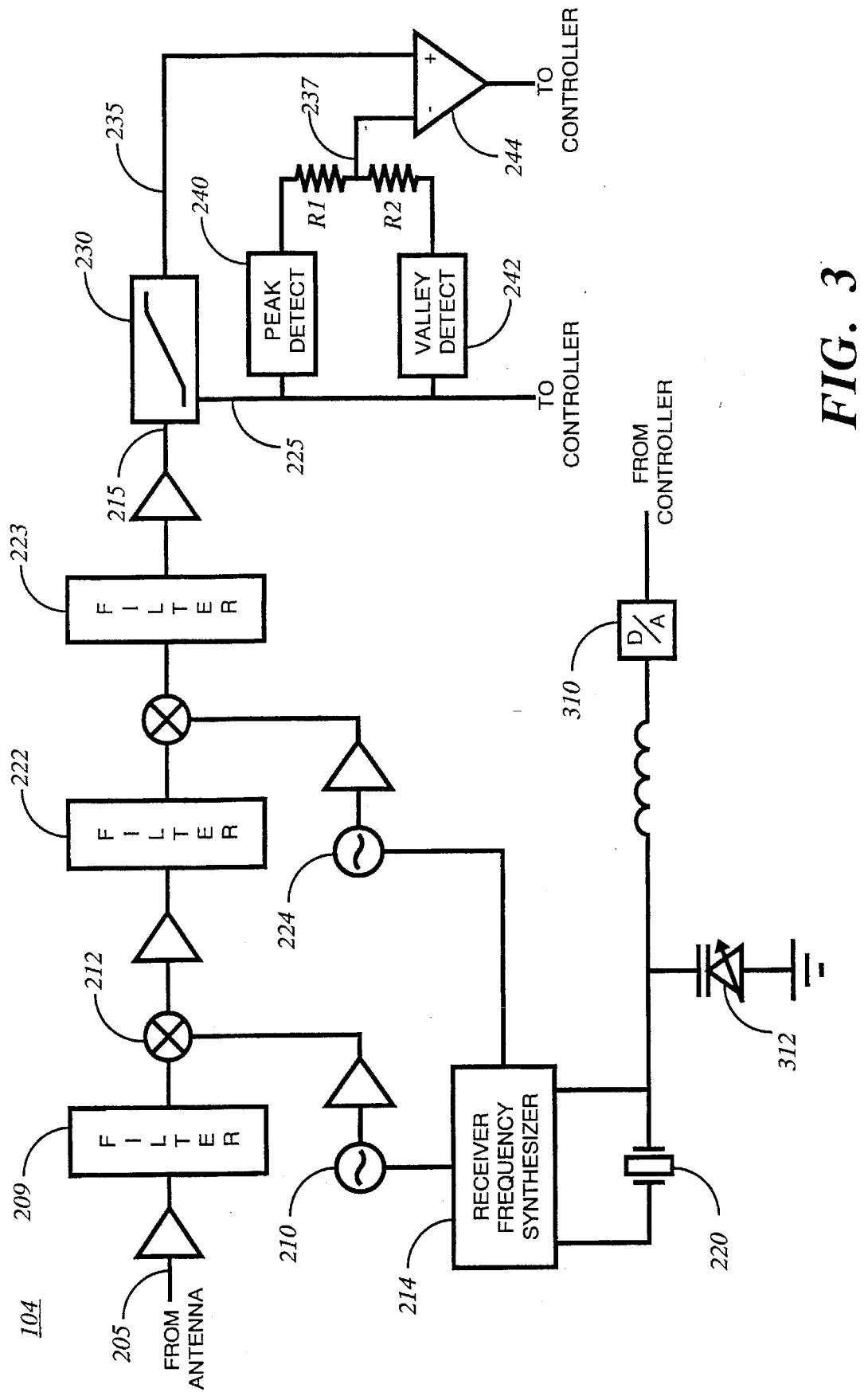
FIG. 3 is a block diagram of the receiver portion of the selective call receiver/transmitter in accordance with the present invention.

Turning now to FIG. 3, the radio frequency signal 205 is passed through the receiver module 104 comprising a combination of filters, mixers and oscillators. The receiver module 104 generates a recovered signal (intermediate signal 215) suitable for processing in a manner well known to those skilled in the art. A preselector filter 209 may be employed to provide image frequency protection by preventing unwanted signals from reaching the mixer. In a preferred embodiment, the radio frequency signal 205 is mixed with a signal from a first local oscillator (LO) 210 contained within the receiver module. The first mixer 212 along with a signal from a frequency synthesizer 214 heterodynes the input signal down to an intermediate frequency signal 215 by a method known to those skilled in the art. The frequency synthesizer 214 includes a crystal oscillator 220 from which is derived a high stability reference signal. The crystal oscillator 220 could utilize AFC to have even greater frequency stability. In a preferred embodiment, the crystal oscillator 220 would include an adiustable frequency crystal which would control both the frequency of the transmitter 112 of the pager 100 and the frequency of the local oscillator(s) 210 of the pager 100.

The signal is then passed through a filter 222. This filter eliminates unwanted signals, controls receiver bandwidth, and provides a signal with the necessary adjacent channel sensitivity. This signal may be mixed with a signal from a second LO 224 within the same receiver module 104 in a manner similar to the operation of the first, converting the signal to a second intermediate frequency.

A second set of IF filters 223 may be employed to control the bandwidth similar to the first IF filter. Additionally, a set of second IF amplifiers/limiters may be employed to provide the receiver gain and eliminate any amplitude modulated signals before the received signal reaches the demodulator.

The intermediate signal 215 is then passed through a demodulator 230 which converts the intermediate signal 215 to an audio voltage (i.e. demodulated signal 225). The demodulator 215 demodulates the downconverted radio frequency paging signals (intermediate signals) provided thereto. That is, the demodulator 215 separates the preamble, address, and message signals from the carrier wave on which they were transmitted by the central station. The demodulated signal is then passed to the microprocessor 106 for address detection and data decoding.

Referring generally to FIGS. 1 and 3, in typical operation, the radio frequency signal 205 including modulated digitally coded data words is received by the antenna 102 and conducted over the signal line to an input section of the receiver circuitry. The signal is conditioned by the conventional receiver and demodulation circuits thereof to recover an analog signal (i.e., demodulated signal 225) which is then conducted over a signal line to the data input port of the microprocessor 106.

The microprocessor 106 of the pager 100 decodes the address signals provided at the data input port and compares the incoming decoded page addresses with the predetermined unique address of the pager 100 which is stored in memory 107. The memory 107 is coupled via a bus to a memory port of the microprocessor 106. When the microprocessor 106 determines that the address corresponds to this pager 100, then the microprocessor 106 decodes the message.

The microprocessor 106 decodes the address and message by first detecting the peaks and valleys of the incoming signal in order to determine one or more threshold levels. The peak detector acquires a peak amplitude from the recovered analog signal and generates a digital signal representative thereof. Concurrently, the valley detect circuit acquires the valley amplitude signal from the recovered analog signal and generates a digital signal representative thereof. These signals are averaged to effect a threshold digital level. Signals above this level could represent binary one and signals below this level could represent binary zero.

The user may then be alerted that a signal has been received either by an output device 108 such as an audio alert (e.g., a speaker) or a tactile alert (e.g., a vibrator). The received signal may also include optional message data directed to some selective call receivers. In a known fashion, microprocessor 106 generates appropriate output signals which are supplied via support module to an audio module and speaker to alert the pager user that a message has been received. The selected message may be stored in a random access memory (RAM) which is coupled via a bus to the microprocessor memory port. A liquid crystal display (LCD) module may be coupled to the display output of the microprocessor such that the selected message received by the pager can be displayed for viewing by the pager user. Alternatively, the pager user can recall the page message from memory subsequent to the alert signal for viewing later. A clock circuit is coupled to a clock input to provide the microprocessor with a reference time base.

A user reply input device 110 may be coupled to a data input port of the microprocessor 106. A variety of switching devices may be used to input data to be transmitted, such as a key entry device. In one embodiment, the user reply input device is a four position switch, the positions of which are respectively designated as choices A, B, C, and D. By a preagreement between the user and the caller, each of the choices is agreed to have a predetermined meaning. The output of the four position switch is readily converted to a digital signal by means readily known in the art. The digital signal is supplied to the data input port for processing by the microprocessor.

Figure 4:
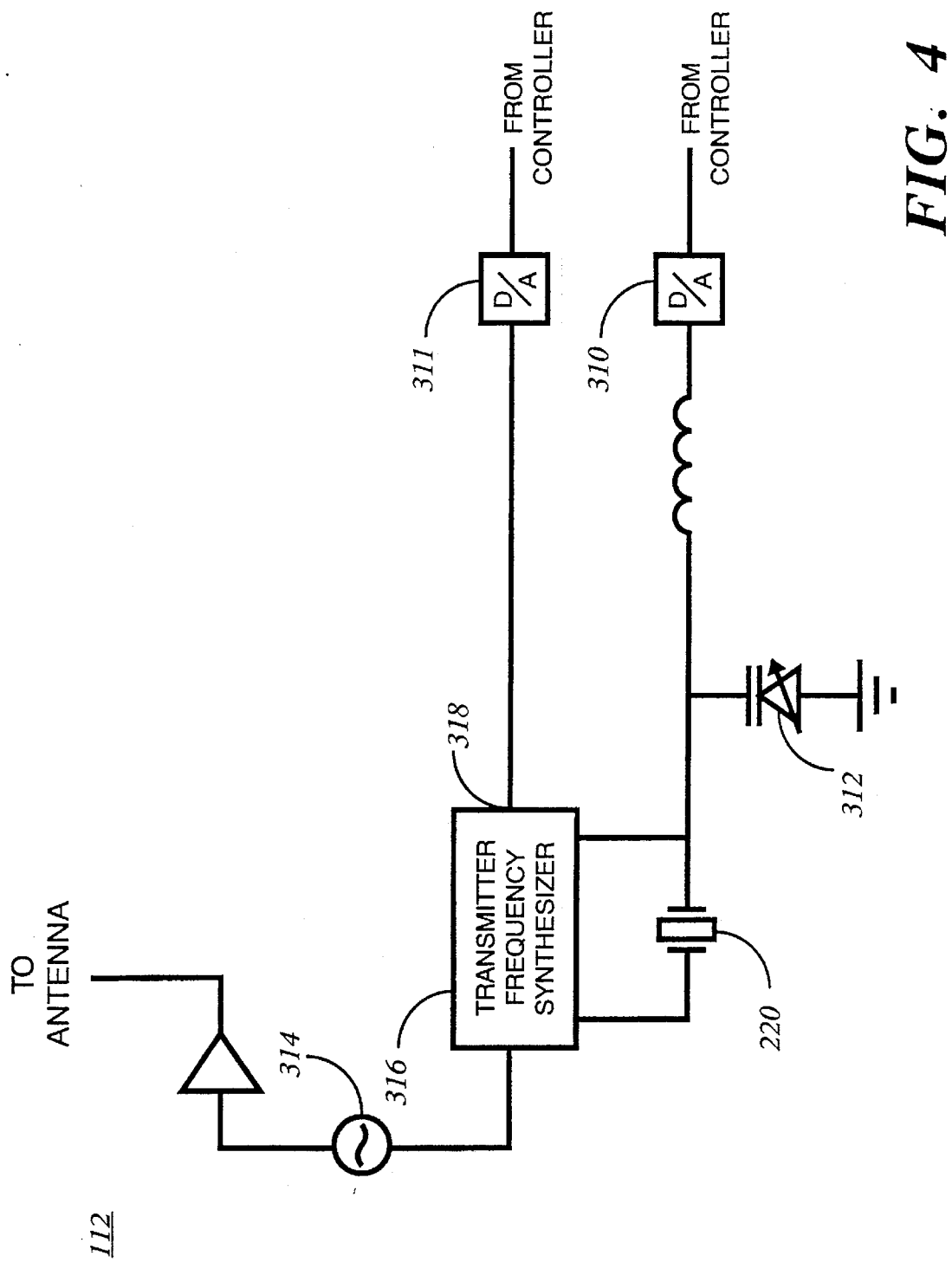
FIG. 4 is a block diagram of the transmitter portion of the selective call receiver/transmitter in accordance with the present invention.

Shown in FIG. 4, the microprocessor 106 supplies binary output data to the input port of a digital to analog (D/A) converter 311. The signal is then supplied to a modulation port 318 on the transmitter frequency synthesizer 316 which creates the modulated transmit frequency. The signal is then transmitted by the antenna 103. The frequency of the transmitter 112 is preferably controlled by the same crystal 220 used with the local oscillator 210 of the receiver 104 whose frequency may be adjusted for automatic frequency control by providing a signal on an output line of the microprocessor 106 or other control means of the pager. For AFC, as shown in FIG. 3, the microprocessor supplies a frequency error correction signal to the input port of a digital to analog (D/A) converter 310. An analog DC voltage proportional to the binary output data appears at the output and is supplied to the input of a varactor 312 which in turn exhibits a change in capacitance proportional to the DC voltage applied thereto. The change in capacitance warps the output frequency of the reference crystal 220 on the receiver frequency synthesizer 214.

Generally described, the automatic frequency control of the pager 100 determines a frequency error value by acquiring peak and valley amplitudes from a demodulated signal of the intermediate signal during a second portion 46 of the synchronization block 32 (during the "A inverse" word 44) and compares a demodulated reference 235 to a calculated mean 237 of the peak and valley amplitudes to provide the frequency error value.

In a preferred embodiment, the automatic frequency control (AFC) of the pager is shown in FIG. 3 and functions as follows. The demodulated signal 225 is passed from the demodulator 230 to the AFC circuitry. The AFC circuitry includes a peak detect circuit 240, a valley detect circuit 242, and a comparison circuit 244. A signal line from the demodulator is coupled to one input of the comparison circuit 244, representing a demodulated reference 235. The demodulated reference 235 is representative of an output of the demodulator 230 when the input is a zero frequency error intermediate frequency. Another output signal line, representative of a demodulated signal 225, is coupled to inputs of the peak and valley detect circuits 240, 242. The outputs of the peak and valley detect circuits 240, 242 are coupled to respective ends of a resistor divider network comprising resistors R1 and R2. The node connection 237 of resistors R1 and R2 is coupled to another input of the comparison circuit 244. The output of the comparison circuit represents the frequency error value 250.

As will be further explained with respect to the method for determining received signal strength utilizing threshold levels, the AFC calculations will only be taken during the second portion 46, or "A inverse" word 44, of the synchronization block 32 of every frame 20. The peak detector 240 acquires a peak amplitude from the recovered analog signal (demodulated signal 225) and generates an analog signal Vp representative thereof. Concurrently, the valley detect circuit 242 acquires the valley amplitude signal from the recovered analog signal (demodulated signal 225) and generates an analog signal Vv representative thereof. The signals Vp and Vv are averaged by the resistor divider network R1 and R2 to effect at the node a threshold analog level Vth 237 which is compared at certain times to the demodulated reference 235 in the comparison circuit 244 to produce the frequency error value signal 250. The demodulated reference 235 is a voltage that would be produced if a perfect unmodulated RF signal was mixed with zero frequency error local oscillator and demodulated.

There may be one or more demodulator references which would correspond to a perfect unmodulated RF signal that would be mixed with a specific frequency errored local oscillator and demodulated. This would allow the comparison circuitry to determine not only the direction of frequency error, but also magnitude.

The output of the comparison circuit representing the frequency error value 250 is coupled over the signal line to the microprocessor 106 for AFC.

In operation, the microprocessor 106 sends a request for the frequency error value, namely the direction and/or magnitude of frequency error detected. The frequency error value 250 is sent to the microprocessor 106 through the microprocessor input/output line. This frequency error value can be an actual error in the crystal frequency or it can be a false frequency error value because of a glitch occurring during the peak and valley detection.

For example, an actual frequency error value would be produced if the crystal 220 is low by 1 ppm. Then the local oscillator (LO) 210 which is controlled by this crystal 220 would also be off by 1 ppm (e.g., if the first LO is highside injection (960 Hz) to produce a second IF frequency of 20 MHz, the 1 ppm error would correspond to 960 Hz.) Accordingly, since the LO mixes with the received signal 205 to create the intermediate frequency (IF), the IF signal 215 would also be off by 1 ppm of the first LO frequency (e.g., 960 Hz). Assuming a perfect second LO, this would result in the audio signal (demodulated signal 225) being low in voltage by an equivalent voltage of 1 ppm of the first LO. For instance, with a 20 mV/kHz discriminator slope, the voltage error would be approximately 19 mV. The frequency error value signal 250 signals the microprocessor 106 that the frequency is low. The microprocessor 106 then can adjust the crystal oscillator 220 to a higher frequency to correct the 1 ppm error.

A particular problem with this AFC scheme is that the quality of the frequency error value information is dependent on the quality of the RF signal. If the signal is poor, then the peak and valley circuitry will give incorrect readings and give an incorrect frequency error value determination to the microprocessor 106. For example, suppose the crystal 220 is not off, but a glitch comes in during the peak and valley detection cycle. This glitch would cause the peak and/or valley level to be miscalculated. Therefore, after this miscalculated level goes through the resistor divider network, an incorrect Vth 237 will be calculated. When this Vth 237 is input to the comparator 244, the output would be a false frequency error value 250.

Accordingly, to validate the AFC scheme, prior to adjusting the crystal 220, the microprocessor 106 must first determine whether this frequency error value signal 250 is actually an error produced by an error in crystal frequency or a false error caused by an inaccurate Vth caused by a glitch or the like. To determine this, the microprocessor 106 must recognize whether the frequency error value signal 250 was determined during a good signal, i.e., no glitches, fade, FM click or like condition which could cause an incorrect reading.

In order to determine whether the frequency error value 250 is accurate, the microprocessor 106 utilizes a method for determining received signal strength utilizing threshold levels calculated prior to the AFC calculations. Based on this signal strength information, the microprocessor 106 can determine whether the frequency error value 250 is accurate or false due to peaks and/or valleys being calculated from a signal containing a glitch or other detrimental signal condition. The microprocessor 106 can then decode this error information to determine whether or not to affect the crystal oscillator 220 for the receiver 104 and/or transmitter 112. Generally described, the method for determining received signal strength of a radio frequency signal of the pager 100 or other frequency dependent device to determine errors in AFC calculations, comprises the steps of: (1) receiving the radio frequency signal 205; (2) providing at least two artificial thresholds based upon the signal during a first portion 45 (e.g., all data prior to the "A inverse" word) of a signal block 32; (3) providing AFC to determine a frequency error value 250 during a second portion 46 (e.g., "A inverse" word 44) of the signal block 32; (4) determining a correction factor to be applied to the frequency error value 250; and (5) varying a frequency of an adjustable crystal 220 in accordance with the correction factor applied to the frequency error value 250.

The crystal 220 is adjusted by providing a signal on an output line of the microprocessor 106 or other control means of the pager 100 in accordance with the correction factor applied to the frequency error value 250; and adjusting the frequency of the adjustable crystal 220 in response to the signal. In a preferred embodiment, the adjustable crystal 220 controls the frequency of a transmitter 112 of the pager and the frequency of a local oscillator 210 of the pager 100. The local oscillator 210 has a signal which is mixed with the radio frequency signal 205 to produce an intermediate signal 215.

The artificial thresholds are determined by acquiring peak and valley amplitudes from a demodulated signal 225 of the intermediate signal 215 during the first portion 45 (all data prior to the "A inverse" word) of the signal block 32; and then generating the artificial thresholds based upon the peak and valley amplitudes, wherein the artificial thresholds lie outside the peak and valley amplitudes.

In the preferred embodiment, in order to effect this method, as previously explained, the AFC calculations are only taken during the "A inverse" word 44 of the synchronization block 32 of every frame 20. In this embodiment, this portion of the sync block 32 only utilizes two-level FSK encoding, although other suitable means of encoding can be utilized. This method will condition the AFC error information on the quality of the audio that it receives during the time the peak and valley detect circuitry 240, 242 measures the peaks and valleys on the same audio 225. As explained previously, the microprocessor 106 of the pager 100 decodes the address and data signals provided at the data input port. For the data prior to the "A inverse" word 44, the peaks and valleys are averaged within the microprocessor 106. The microprocessor 106 decodes the data by first detecting the peaks and valleys of the incoming signal. The microprocessor 106 acquires a peak amplitude of the recovered analog signal and generates a digital signal Vp representative thereof. Concurrently, the microprocessor 106 acquires the valley amplitude signal from the recovered analog signal and generates a digital signal Vv representative thereof. These signals are averaged to effect a threshold digital level Vth.

From this averaged data, new artificial thresholds are calculated that lie outside the data. The artificial thresholds are generated by (1) applying at least one of a plurality of predetermined values to the peak amplitude to obtain at least one upper artificial threshold lying outside the peak amplitude; and (2) applying at least one of the plurality of predetermined values to the valley amplitude to obtain at least one lower artificial threshold lying outside the valley amplitudes; wherein the predetermined values are based upon at least one percentage of a magnitude difference of the peak and valley amplitudes. For example, for a new threshold value which is 10% greater, Vp1 (new) would be calculated by Vp+(Vp–Vth)/10. Likewise, Vv(new) would be calculated by Vv1–(Vp–Vth)/10. Additional thresholds could be calculated in the same manner, (e.g., Vp2 and Vv2 could be 15% greater).

Accordingly, if a glitch crosses these new artificial thresholds during the "A inverse" word 44, when the AFC error information is measured, the microprocessor 106 recognizes that the signal has experienced a glitch, fade, FM click, or other signal condition and can weigh that information accordingly. In the preferred embodiment, the microprocessor establishes a correction factor based upon the position of the demodulated signal in relation to the artificial thresholds during the second portion 46 ("A inverse" word 44) of the signal block 32. The correction factor would be used to correct or modify the frequency error value 250 determined during the AFC calculations.

For example, the microprocessor may decide only to adjust the crystal 220 when the frequency error value 250 is accurate (i.e. no artificial thresholds crossed) and to ignore any false frequency error value (i.e. artificial thresholds crossed). That is, the correction factor may negate the frequency error value 250 when the demodulated signal crosses any of the artificial thresholds at any point during the second portion 46 ("A inverse" word 44)of the signal block 32 and leave unchanged the frequency error value 250 when the demodulated signal fails to cross any of the artificial thresholds at any point during the second portion 46 of the signal block 32.

The microprocessor 106 may, alternatively, supply a correction factor which changes a weight given to the frequency error value 250 when the demodulated signal crosses any of the artificial thresholds at any point during the second 46 of the signal block. For example, if multiple artificial thresholds are calculated, the microprocessor 106 can determine how far off the error information is by which of the thresholds were crossed. For example, if Vp1 is crossed but not Vp2, then the error information would be more accurate than if Vp2 was crossed. Likewise, if Vv1 is crossed but not Vv2, then the error information would be more accurate than if Vv2 was crossed. The microprocessor can utilize these multiple thresholds to give weight to the error information.

Alternately, the correction factor could vary the frequency error value by a factor dependent upon which of a plurality of upper artificial thresholds or which of a plurality of lower artificial thresholds of the artificial thresholds are crossed by the demodulated signal at any point during the second portion 46 of the signal block 32. For example, if peak thresholds were crossed because of a glitch, but valley thresholds were not crossed, the correction factor could vary the frequency error value by a factor to adjust for the error which was caused by an incorrect peak value.

In addition to these added thresholds, the microprocessor 106 can condition the information on the number of bit errors received during the "A inverse" word 44. This conditioning of the frequency error information greatly improves the lock time of the AFC feedback loop because the validity of the AFC error information is assured.

An advantage of this method and apparatus for determining received signal strength utilizing threshold levels is that the microprocessor 106 can recognize whether the signal has experienced a glitch, fade or FM click, and can weigh that information accordingly. Furthermore, since temperature fluctuations normally occur slowly, the circuitry can be updated accordingly, thereby eliminating the need for a temperature compensation circuit.

Thus, it is apparent that there has been provided, in accordance with the invention, a method and apparatus for determining received signal strength utilizing threshold levels. While the invention has been described and illustrated with reference to specific embodiments thereof, it is not intended that the invention be limited to these illustrative embodiments. Those skilled in the art will recognize, after review of the foregoing description, that variations and modifications differing from the illustrative embodiments are possible. It is intended that all such variations and modifications as fall within the spirit and scope of the invention be included within the appended claims.

What is claimed is:

1. A method for operating an automatic frequency control in a radio, the method comprising the steps of:

receiving a radio frequency (RF) signal;

demodulating the RF signal in a demodulator to obtain a demodulated signal;

acquiring first peak and valley amplitudes of the demodulated signal during a first portion of a signal block;

forming at least two artificial thresholds based upon the first peak and valley amplitudes, wherein the at least two artificial thresholds lie outside the first peak and valley amplitudes;

determining a correction factor in response to whether a crossing of at least one of the at least two artificial thresholds by the demodulated signal has occurred during a second portion of the signal block; and operating the automatic frequency control in accordance with the correction factor to control a frequency generated within the radio.

2. The method of claim 1, wherein the operating step comprises the step of controlling a transmitter frequency.

3. The method of claim 1, wherein the operating step comprises the steps of:

measuring a frequency error value during the second portion of the signal block; and applying the frequency error value in accordance with the correction factor.

4. The method of claim 3, wherein the measuring step further comprises the steps of:

acquiring second peak and valley amplitudes of the demodulated signal during the second portion of the signal block; and comparing a demodulated reference to a calculated mean of the second peak and valley amplitudes to provide the frequency error value, wherein the demodulated reference is representative of an output of the demodulator when an input is a zero frequency error intermediate frequency.

5. The method of claim 3, wherein the correction factor negates the frequency error value when the demodulated signal crosses any of the at least two artificial thresholds at any point during the second portion of the signal block, and wherein the correction factor leaves unchanged the frequency error value when the demodulated signal fails to cross any of the at least two artificial thresholds at any point during the second portion of the signal block.

6. The method of claim 3, wherein the correction factor changes a weight given to the frequency error value when the demodulated signal crosses any of the at least two artificial thresholds at any point during the second portion of the signal block.

7. The method of claim 3, wherein the correction factor varies the frequency error value by a factor dependent upon which of a plurality of upper artificial thresholds or which of a plurality of lower artificial thresholds of the at least two artificial thresholds are crossed by the demodulated signal at any point during the second portion of the signal block.

8. An automatic frequency control apparatus for a radio, comprising:
   receiver means for receiving a radio frequency (RF) signal;
   demodulator means coupled to the receiver means for demodulating the RF signal to obtain a demodulated signal;
   peak and valley detection means coupled to the demodulator means for acquiring first peak and valley amplitudes of the demodulated signal during a first portion of a signal block;
   controller means coupled to the peak and valley detection means and coupled to the demodulator means for forming at least two artificial thresholds based upon the first peak and valley amplitudes, wherein the at least two artificial thresholds lie outside the first peak and valley amplitudes; and
   oscillator means having an automatic frequency control means coupled to the controller means for controlling a frequency generated by the oscillator means,
   wherein the controller means is programmed to:
      determine a correction factor in response to whether a crossing of at least one of the at least two artificial thresholds by the demodulated signal has occurred during a second portion of the signal block; and
      operate the automatic frequency control means in accordance with the correction factor to control the frequency generated.

9. The apparatus of claim 8, wherein the radio comprises a transmitter coupled to the controller means and operating on a transmitter frequency, and wherein the controller means is further programmed to
   control the transmitter frequency.

10. The apparatus of claim 8, wherein the controller means is further programmed to:
   measure a frequency error value during the second portion of the signal block; and
   apply the frequency error value in accordance with the correction factor.

11. The apparatus of claim 10, wherein to measure the frequency error value the controller means is programmed to:
   acquire second peak and valley amplitudes of the demodulated signal during the second portion of the signal block; and
   compare a demodulated reference to a calculated mean of the second peak and valley amplitudes to provide the frequency error value, wherein the demodulated reference is representative of an output of the demodulator means when an input is a zero frequency error intermediate frequency.

12. The apparatus of claim 10, wherein the correction factor negates the frequency error value when the demodulated signal crosses any of the at least two artificial thresholds at any point during the second portion of the signal block, and wherein the correction factor leaves unchanged the frequency error value when the demodulated signal fails to cross any of the at least two artificial thresholds at any point during the second portion of the signal block.

13. The apparatus of claim 10, wherein the correction factor changes a weight given to the frequency error value when the demodulated signal crosses any of the at least two artificial thresholds at any point during the second portion of the signal block.

14. The apparatus of claim 10, wherein the correction factor varies the frequency error value by a factor dependent upon which of a plurality of upper artificial thresholds or which of a plurality of lower artificial thresholds of the at least two artificial thresholds are crossed by the demodulated signal at any point during the second portion of the signal block.

15. A radio communication device, comprising:
   a receiver for receiving a radio frequency (RF) signal;
   a demodulator coupled to the receiver for demodulating the RF signal to obtain a demodulated signal;
   peak and valley detectors coupled to the demodulator for acquiring first peak and valley amplitudes of the demodulated signal during a first portion of a signal block;
   a controller coupled to the peak and valley detectors and coupled to the demodulator for forming at least two artificial thresholds based upon the first peak and valley amplitudes, wherein the at least two artificial thresholds lie outside the first peak and valley amplitudes; and
   an oscillator having an automatic frequency control element coupled to the controller for controlling a frequency generated by the oscillator,
   wherein the controller is programmed to:
      determine a correction factor in response to whether a crossing of at least one of the at least two artificial thresholds by the demodulated signal has occurred during a second portion of the signal block; and
      operate the automatic frequency control element in accordance with the correction factor to control the frequency generated.

16. The radio communication device of claim 15, further comprising a transmitter coupled to the controller and operating on a transmitter frequency, wherein the controller is further programmed to
   control the transmitter frequency.

17. The radio communication device of claim 15, wherein the controller is further programmed to:
   measure a frequency error value during the second portion of the signal block; and
   apply the frequency error value in accordance with the correction factor.

18. The radio communication device of claim 17, wherein to measure the frequency error value the controller is programmed to:
   acquire second peak and valley amplitudes of the demodulated signal during the second portion of the signal block; and
   compare a demodulated reference to a calculated mean of the second peak and valley amplitudes to provide the frequency error value, wherein the demodulated reference is representative of an output of the demodulator when an input is a zero frequency error intermediate frequency.

19. The radio communication device of claim 17, wherein the correction factor negates the frequency error value when the demodulated signal crosses any of the at least two artificial thresholds at any point during the second portion of the signal block, and wherein the correction factor leaves unchanged the frequency error value when the demodulated signal fails to cross any of the at least two artificial thresholds at any point during the second portion of the signal block.

20. The radio communication device of claim 17, wherein the correction factor changes a weight given to the frequency error value when the demodulated signal crosses any of the at least two artificial thresholds at any point during the second portion of the signal block.

21. The radio communication device of claim 17, wherein the correction factor varies the frequency error value by a factor dependent upon which of a plurality of upper artificial thresholds or which of a plurality of lower artificial thresholds of the at least two artificial thresholds are crossed by the demodulated signal at any point during the second portion of the signal block.

* * * * *